US00RE37517E

(19) United States
(12) Reissued Patent
Khovaylo

(10) Patent Number: US RE37,517 E
(45) Date of Reissued Patent: Jan. 22, 2002

(54) PORTION OF AN OPTICAL SCANNER

(75) Inventor: Modest Khovaylo, Fort Collns, CO (US)

(73) Assignee: Hewlett-Packard Company, Palo Alto, CA (US)

(21) Appl. No.: 29/039,810

(22) Filed: May 31, 1995

Related U.S. Patent Documents

Reissue of:
(64) Patent No.: Des. 336,078
Issued: Jun. 1, 1993
Appl. No.: 07/697,478
Filed: May 8, 1991

(51) LOC (6) Cl. ..... 14-02
(52) U.S. Cl. ..... D14/441
(58) Field of Search ..... D14/100, 105, D14/107, 109; D18/36, 40; 250/203.1, 566, 568; 235/454, 470; 382/58, 62, 63, 65; 355/235

(56) References Cited

U.S. PATENT DOCUMENTS

| | | | | |
|---|---|---|---|---|
| 4,623,937 A | * | 11/1986 | Watanabe | 355/235 X |
| D295,412 S | * | 4/1988 | Izaki | D14/107 |
| D295,520 S | * | 5/1988 | Ooie | D14/107 |
| D303,660 S | * | 9/1989 | Yamagiwa et al. | D14/107 |
| D318,654 S | * | 7/1991 | Huang | D14/107 |
| D328,290 S | * | 7/1992 | Tanaka | D14/107 |
| D351,378 S | * | 10/1994 | Nakazawa et al. | D14/107 |

* cited by examiner

*Primary Examiner*—Freda Nunn

(57) CLAIM

The ornamental design for *a portion of* an optical scanner, as shown and described.

DESCRIPTION

*This application and application Ser. No. 29/051,765 are both copending reissue applications of the same original patent Des. 336,078 issued June 1, 1993.*

FIG. 1 is a right side perspective view of *a portion of* an optical scanner showing my new design; *and,*

FIG. 2 is a top plan view thereof[;].

[FIG. 3 is a right side elevational view thereof, the left side elevational view being a mirror image;]

[FIG. 4 is a front elevational view thereof;]

[FIG. 5 is a rear elevational view thereof; and,]

[FIG. 6 is a bottom plan view thereof.]

[FIGS. 2–6 are drawn on an enlarged scale.]

*The scanner housing is shown in broken lines in the figures for illustrative purposes only and forms no part of the claimed design.*

1 Claim, 1 Drawing Sheet

Matter enclosed in heavy brackets [ ] appears in the original patent, but forms no part of this reissue; matter printed in italics indicates the additions made by reissue.

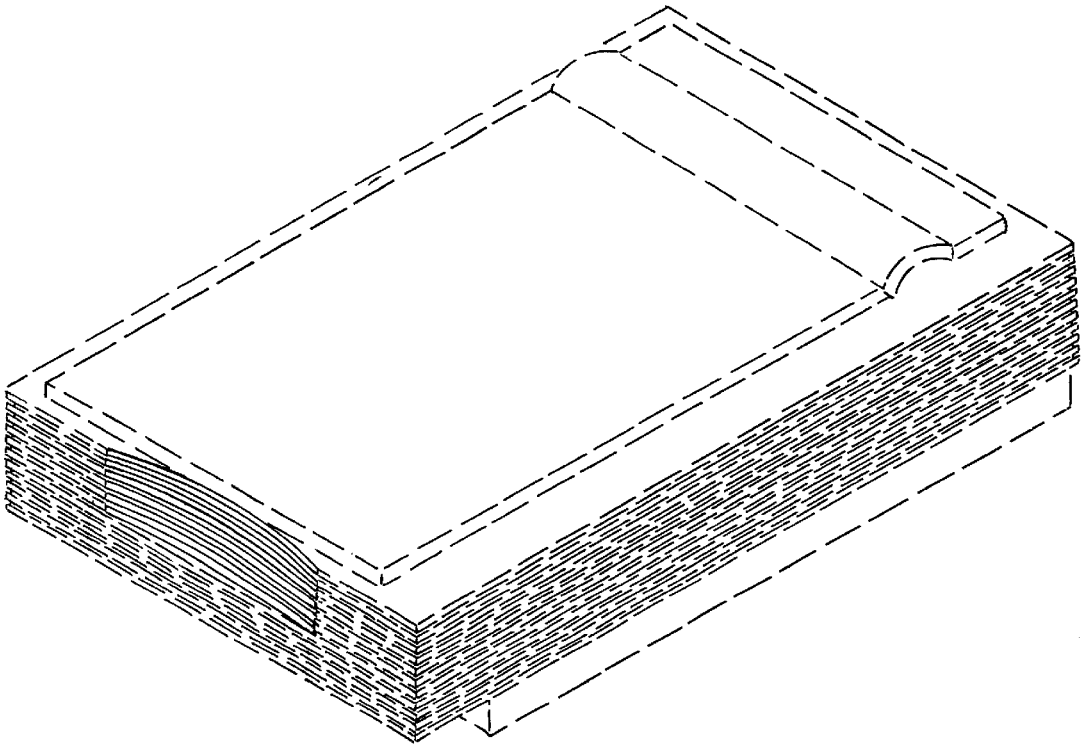
FIG.1 (NEW)
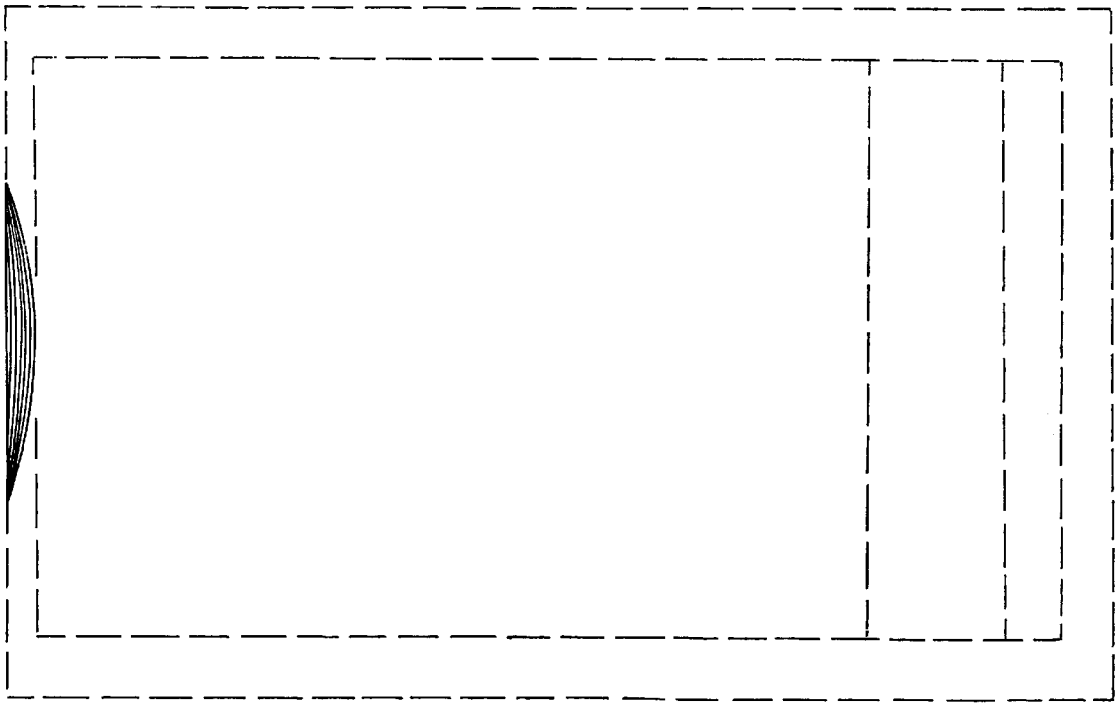
FIG.2 (NEW)